Feb. 7, 1967 H. W. CHRISTENSON ET AL 3,302,390
TRANSMISSION
Original Filed May 10, 1963 2 Sheets-Sheet 1
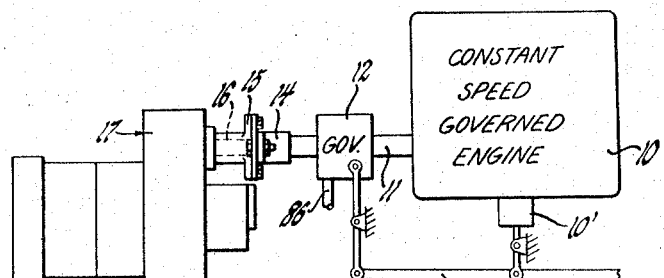
Fig. 1
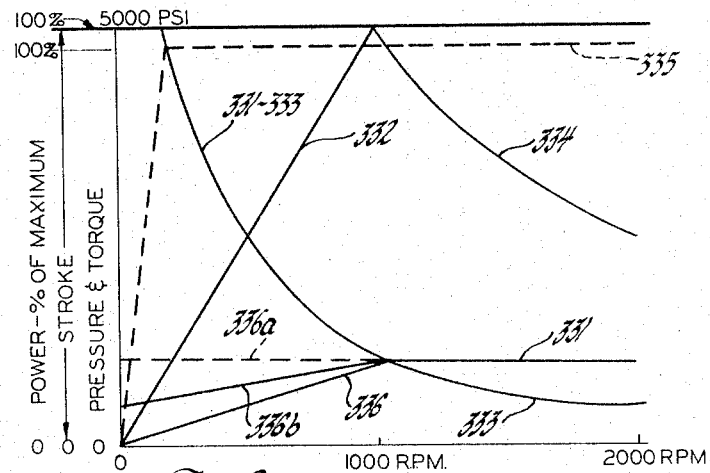
Fig. 2
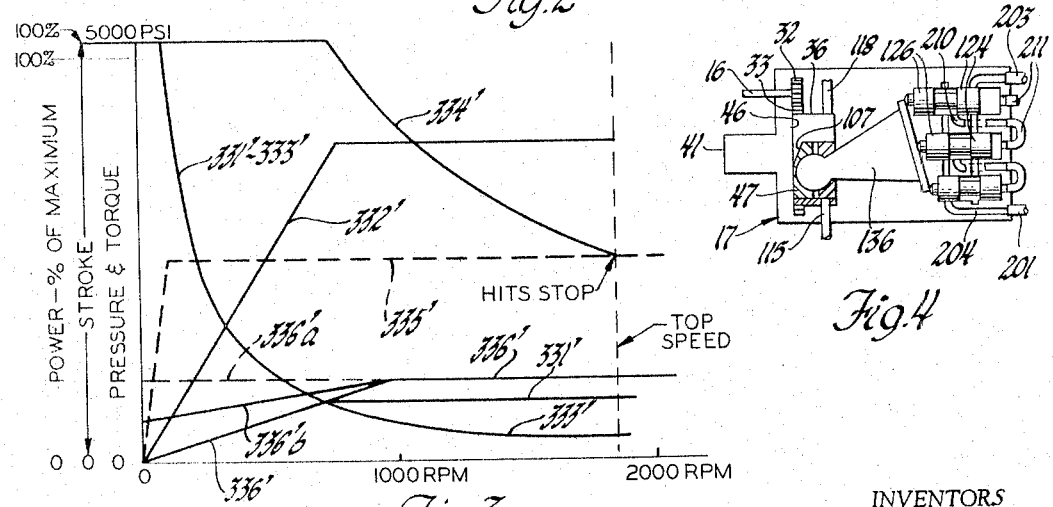
Fig. 3
Fig. 4
INVENTORS
Howard W. Christenson,
James J. Mooney, Jr. &
Robert H. Schaefer
BY A. M. Neiter
ATTORNEY

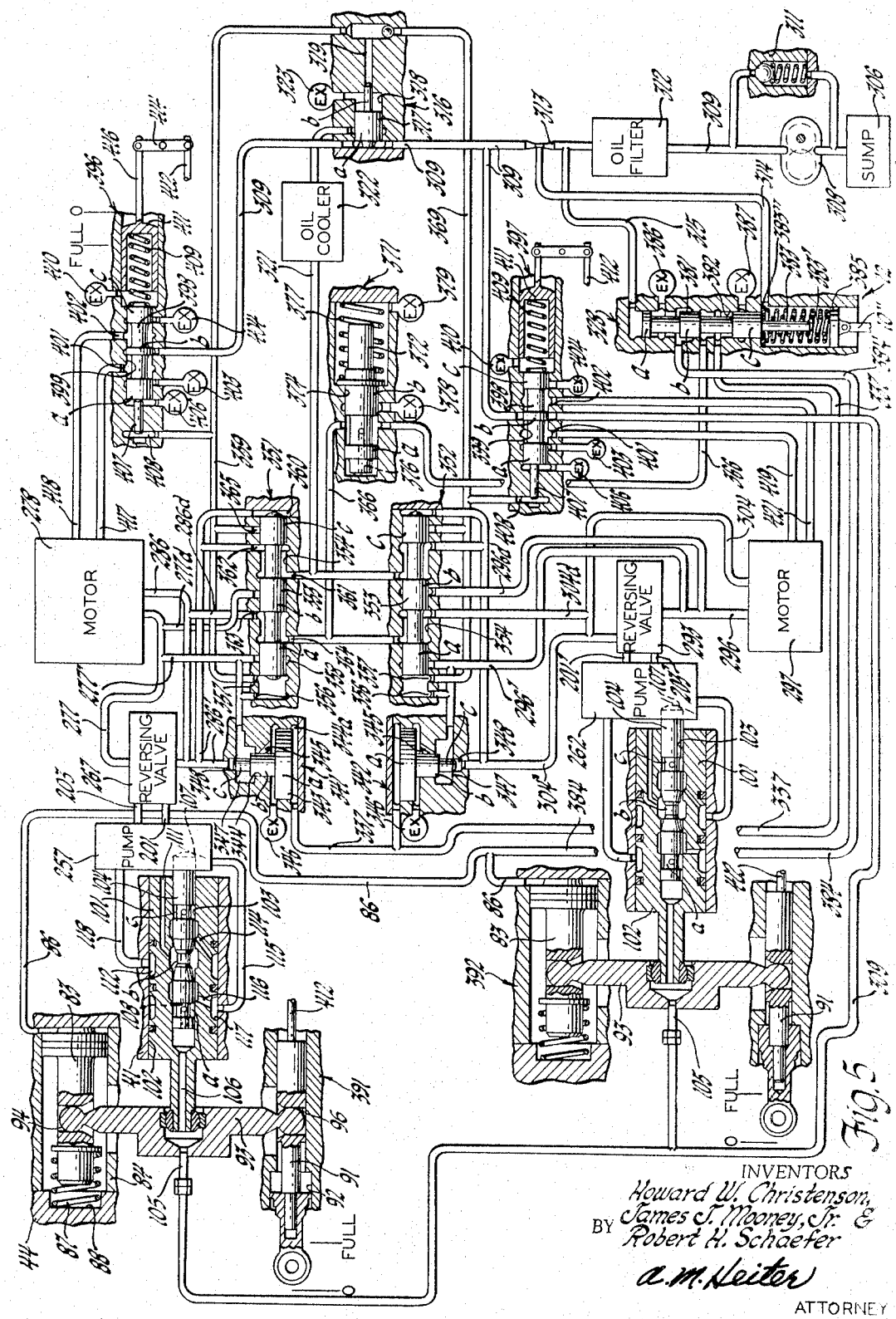

United States Patent Office 3,302,390
Patented Feb. 7, 1967

3,302,390
TRANSMISSION
Howard W. Christenson and James J. Mooney, Jr., Indianapolis, and Robert H. Schaefer, Westfield, Ind., assignors to General Motors Corporation, Detroit, Mich., a corporation of Delaware
Original application May 10, 1963, Ser. No. 279,372. Divided and this application May 31, 1966, Ser. No. 553,986
12 Claims. (Cl. 60—19)

This invention relates to a power plant and more particularly to an engine and transmission or a transmission control system and is a division of the applicants' application Serial No. 279,372, filed May 10, 1963, now Patent No. 3,273,344.

The control system automatically controls the pump and motor displacement in accordance with power demand or pump stroke demand, input speed and power system pressure to operate the system with a low power transmitting fluid flow and at high pressures above a predetermined minimum high pressure to maintain high efficiency. In neutral the reversing valve interconnects the pump delivery and return lines and the motor supply and exhaust lines to unload the pump and permit the motor to free-wheel. With the reversing valve in forward, the pumps are connected to drive the motor forward. At zero power or pump stroke demand, the pump capacity is zero and no fluid is pumped or drive transmitted. With a constant speed governor control of the engine, more fuel is supplied as the load increases to make full power available at all times. Since the motor, though at maximum displacement for full power operation, is not moving, the system pressure immediately rises to a maximum high pressure value limited by a regulator valve to provide a high starting torque. As the motor moves and drives at a low speed, it remains at maximum displacement while the pump displacement is gradually increased and the system pressure quickly falls providing increasing speed with reduced torque multiplication. At a predetermined speed, preferably about .5 speed ratio for full power drive, the pump stroke reaches a maximum and the motor stroke is then gradually reduced with increasing speed ratio to about half stroke at full speed. During this phase of operation, the system pressure would normally continue to decrease, but pressure controls are provided to prevent further reduction in pressure and maintain the pressure at a constant minimum high pressure value for improved efficiency.

At partial power output values obtained by reducing the governor speed control, the pump displacement will increase at the same gradual increase to a similar partial displacement value and thereafter remain at this displacement value. The motor will initially have full stroke, but at the same speed that the pump displacement ceases to increase, the motor displacement will start decreasing. The system pressure will decrease faster and be maintained at the same minimum high pressure value. The torque multiplication curve will remain the same.

The operation in reverse is the same except that the connections between the pump and motor are reversed to drive the motor reversely.

An object of the invention is to provide in a speed governed engine drive for a hydrostatic transmission having a speed responsive control, a common control for adjusting the speed setting of the engine governing signal and the transmission governing signal.

Another object of the invention is to provide in a governed engine driving a hydrostatic transmission having speed control of the capacity of one or both of the pump and motor, a common control for adjusting the speed setting of the engine governing signal and the transmission governing signal.

Another object of the invention is to provide in a governed engine driving a hydrostatic transmission having speed control of the power circuit pressure, a common control for adjusting the speed setting of the engine governing signal and the transmission governing signal.

These and other objects of the invention will be more apparent from the following description and drawing illustrating the preferred embodiments of the invention.

FIGURE 1 diagrammatically shows an engine, governor and transmission pump arrangement employed in this transmission.

FIGURE 2 shows the operating curves for these hydrostatic transmissions at full power.

FIGURE 3 shows the operating curves for the hydrostatic transmissions shown in FIGURE 5 at half power.

FIGURE 4 is a diagrammatic view of the pump.

FIGURE 5 diagrammatically shows a hydrostatic transmission and control system.

Hydrostatic transmissions illustrative of the invention are shown in the drawing. FIGURE 1 shows a constant speed governed engine 10 having an output shaft 11 driving a speed responsive governor 12, shown in FIG. 5, and a pump 17 of a hydrostatic transmission. The engine has a conventional constant speed governor 10' which controls the fuel feed to the engine to maintain a predetermined constant speed. The governor speed setting may be varied or adjusted by linkage 10'' to partial speeds. The output shaft 11 is connected by a coupling part 14 to the coupling part 15 mounted on the input shaft 16 of the transmission pump unit 17 which has an adjustable crank drive assembly 36 driving a swash plate driven pump.

The pump and motor units may be as shown in the applicants' application Serial No. 279,372 or other known types. Referring to FIG. 5, the input shaft 16 is connected by a spur gear 32 and a ring gear 33 to rotate the crank shaft assembly 36 which has a transverse cylinder 46 and piston 47. The arm end of swash plate 136 is universally pivoted in the piston and thus reciprocal movement of the piston adjusts the angle of the swash plate assembly and rotary movement of the crank assembly wobbles the swash plate so the plate end reciprocates the pistons 126 located in cylinders 124 to pump fluid from the return line 201 to the delivery or outlet line 203. The passages 210–211 connect the cylinders as explained in Serial No. 279,372.

The pump displacement control system has an overload control and manual actuator located on a fixed housing portion 44 and a valve 101 mounted in the journal portion 41 of the cylinder assembly 36. The engine overload control piston 83 is located in cyilnder 84 in fixed housing 44. A fluid pressure signal indicating underspeed is supplied from the engine output speed governor valve 328, FIG. 5, by line 384–86 to cylinder 84 to urge piston 83 against the biasing force of spring 87 on seat 88 at the vented end of the cylinder. A pump stroke control rod 91 is reciprocally mounted on a suitable bore 92 in housing 44. A lever 93 is pivotally connected at one end by the ball and socket connection 94 to the control piston 83 and at the other end by the ball and socket connection 96 to the control rod 91. At a central or other intermediate portion, the control lever 93 has a ball and socket 98 to pivotally connect lever 93 to valve element 101 and to connect passages 105 and 106.

The valve element 101 is reciprocally mounted in bore 102 of journal 41 and has an inner bore 103 in which the follower valve 104 is reciprocally mounted. The control fluid is supplied via the control pressure line 362 having a flexible portion 105 connected to the socket 98 to lubricate the ball and socket connection. The fluid acts on the unbalanced area of the ball to hold the ball in sealing engagement with the socket. The fluid is supplied by passage 106 extending through the ball to the bore 103 to act against the unbalanced area of valve element 104 to hold the valve in contact with the cam surface 107 on the piston. Fluid is supplied from bore 103 via passage 108 to the grooves *a* and *c* of follower valve element 104 which, in neutral position shown, are blocked. The groove *b* is connected to exhaust port and passage 111. Movement of the follower valve element 104 to the right or the control valve element 101 to the left will connect the port 112 via passage 114 to exhaust 111 to drain the lower end of the cylinder via passage 115, and to supply fluid via passage 116 and port 117 to the passage 118 connected to the upper end of the cylinder to move the piston 47 to a more eccentric position to increase the pump stroke and displacement. The opposite movement of either the follower valve 104 or the control valve 101 will connect the lower end of the cylinder 46 via passage 115, port 112, passage 114, and groove *c* to the source of fluid supply to decrease pump stroke and connect the upper end of the cylinder via passage 118, port 117, passage 116 and groove *b* to the exhaust passage 111. Thus it will be seen that piston assembly 47 assumes a definite position for each position of the control valve element 101, which is positioned under the joint control of the manual control rod 91 and the governor control piston 83. This provides a joint manual and governor control for the degree of eccentricity of the piston assembly 47 to control the pump stroke and displacement.

Both the flat and spherical surfaces have recessed areas to hydraulically reduce the loading and may have connecting lateral or radial lubricating passages. The plate of swash plate assembly 243 extends radially beyond the pistons 223c and is supported on its external perimeter by a cylindrical bearing 249 mounted on the housing. The crank assembly 250 is similar to the crank assembly of FIGURE 3, but the arm of the swash plate assembly 243 is connected by a universal ball joint 249' transmitting thrust in both directions to the piston 240. The cylinder 239 and piston 240 are mounted at an angle to the axis of rotation of the swash plate and substantially perpendicular to the axis of the arm of the swash plate assembly 243 when in the mean control position from a standpoint of total linear movement for control or when in the normal position during operation to minimize the lateral thrust transmitted from the piston to the cylinder so that most thrust is transmitted through the control fluid.

*Motor*

The above described pump may be used as a motor with the displacement control valve shown in the control system. When high pressure fluid is supplied to the fluid inlet line in the above pumps, they will rotate the crank assembly in the direction it is driven as a pump to drive the output which is connected through gearing to the vehicle drive mechanism.

*Transmission system reversing valve connecting pumps and motors*

The hydrostatic torque converters described above may be employed as either a pump or a motor in hydrostatic transmissions. The system employs two pumps and two motors so that they may all be of identical structure except for the control valves. The input shaft 16 is used as a common input shaft driven by the engine and drives a spur gear 32 to drive a gear 33 of the right pump 257 and drive a gear 33 of the left pump 262. The pumps 257 and 262 are the same and have the crank drive assembly with a displacement control cylinder, piston and valves and a pump having swash plate driven pistons in cylinders. The right pump 257 supplies fluid at high pressure through its power fluid delivery or outlet line 203 to the right reversing valve 267 which in the forward position connects line 203 to motor supply line 277 to drive right motor 278 forwardly and the exhaust from the motor flows from the motor via exhaust line 286 to reversing valve 267 which connects the motor exhaust to the pump inlet line 201 to complete the forward drive power circuit. For reverse drive, the reversing valve 267 is moved from the forward position to the reverse position connecting pump outlet line 203 to motor exhaust line 286 to supply power fluid to motor 278 to drive the motor in a reverse direction. The motor exhaust flows via supply line 277 to reversing valve 267 to pump inlet line 201. The motors have an output drive like the gear 33 connected by a spur gear 32 to a shaft 16 to drive wheels, tracks or other traction, propulsion or drive devices. In neutral position the reversing valve interconnects all lines, pump inlet and outlet lines 201 and 203 and motor supply and exhaust lines 277 and 286 to unload the pump and permit freewheeling of the motor.

The left pump 262 has a similar fluid power circuit having the left motor inlet and outlet lines 201' and 203' connected to left reversing valve 293 and left motor supply line 296 and exhaust line 304 connecting the left reversing valve 293 to the left motor 297. The left reversing valve 293 is moved to forward position to control left motor 297 to provide forward drive to neutral to provide pump unloading and motor freewheeling and to reverse to provide reverse drive in the same way as explained above for the right pump and motor units.

*Control and cooling fluid supply*

The exhaust from the control system and leakage from the pumps and motors or hydrostatic torque converters is returned to sump 306. Pump 308 delivers fluid from sump 306 to main line 309 at a volume or flow rate proportional to pump and engine speed and at a pressure limited to a high control pressure value, i.e., 550 p.s.i., to prevent unsafe pressure, which occurs only due to system blockage or other malfunction, by safety bypass valve 311. The main line flows through oil filter 312 and venturi orifice 313 having a high pressure governor line connected to the main line in the high pressure zone before the venturi orifice and a low pressure governor line connected to the venturi throat to provide a pressure differential in these governor lines proportional to flow or the speed of pump 308 and the engine which drives the control fluid pump 308 and the power pumps 257 and 262.

The main line 309 is connected to a control pressure regulator valve 316 having a valve element 317 having a large land *a* and a small land *b* located in a stepped bore 318. The main line is connected to the large end of the bore to act on land *a* and the pressure control line 319 connects the highest of the motor supply or exhaust pressure or the maximum power circuit pressure to act on the small land *b* to oppose main line pressure to regulate main line at a pressure less than but proportional to power circuit pressure, which may vary between 1000 and 5000 p.s.i. and with a 1/10 proportion valve 316 to provide a main line pressure between 150 and 500 p.s.i. Thus the main line provides a control pressure proportional to power circuit pressure and control requirements. The excess fluid is exhausted via cooling and makeup line 321 which flows through cooler 322 to the cooling supply valves 351 and 352. The space between lands *a* and *b* of valve element 317 is exhausted by exhaust 323 so the valve will move freely.

*Cutoff valves*

The right and left cutoff or regulator valves 341 and 342 regulate the pressure differential between the motor supply and exhaust lines of the right and left pumps 257 and 262. During normal drive operation in either forward or reverse, the pressure in the supply lines 277 and 296 is limited to a high value and any excess pressure is relieved by connecting the supply line to the respective exhaust line 286 or 304. When the vehicle overruns the engine and engine is being employed to brake the vehicle, excessive pressure in the exhaust lines 286 or 304 is relieved by venting the lines through a regulated restriction to the respective supply lines 277 and 296 to prevent overspeeding the engine. This flow of fluid through the restriction provides added braking effort.

The right cutoff valve 341 has a valve element 343 having a large land $a$, an intermediate size land $b$ and a small land $c$, located in a three-stepped bore 344. The active areas of lands $b$ and $c$ are equal. The overspeed signal line 337, which provides a pressure below overspeed from governor valve 328 as described below, is connected to the closed end of the largest diameter portion of the bore 344 to act on the land $a$. The opposite face of land $a$, adjacent land $b$ is free of pressure since this portion of the large bore is vented to exhaust 346. The motor supply line 277 has a branch 277' connected to a port 347 to act on the land $b$. The motor exhaust line 286 has a branch 286' connected to the port 348 normally closed by the land $c$.

Cutoff valve operation

During normal forward driving operation when there is excessive pressure, i.e., above 5000 p.s.i., in the supply line 277, this pressure is conducted by branch 277' to port 347 to act on the unbalanced area of land $b$, and when it overcomes the signal pressure in line 337 acting on land $a$, it moves the valve to open port 348 permitting the high pressure fluid in supply line 277 to flow through the branch 277', ports 347 and 348 to the branch 286' and motor exhaust line 286 to reduce the pressure in the supply line. Similarly, on overrun, when the motor exhaust line 286 is at a high pressure, fluid in branch 286' acts on the unbalanced area of land $c$ to overcome the signal pressure on land $a$ and open the valve connecting the exhaust line through ports 348 and 347 and branch 277' to the supply line 277. Whenever on overrun, engine overspeed, i.e., above 2200 r.p.m. occurs, the pressure in signal line 337 is vented by the overspeed control valve 328 permitting the cutoff valve 341 to open to immediately reduce the pressure differential between the motor supply line 277 and exhaust line 286 to provide only sufficient energy differential or pressure drop across the pump to motor the pump and engine at governed speed and by the regulated restriction or throttling of the valve add a hydraulic braking effect.

During reverse drive, the cutoff valve operates as described above the forward drive, but with the high pressure in branch 286' and during reverse overrun the valve operates as described above for forward overrun, but with the higher pressure in branch 277' to provide the same functions. When the cutoff valve opens during normal forward and reverse drive to limit the pump output pressure, and during overrun to limit engine speed and provide hydraulic braking, there is a great deal of heat generated by the fluid flowing through the restriction of this valve and thus when the valve opens, land $b$ uncovers bypass port 345 which permits a portion of the fluid to exhaust to the sump to be filtered and cooled by passing through the filter and heat exchanger before it is returned to the system through the makeup line 321.

The left cutoff valve 342 is constructed and functions in the same manner and the same reference numerals have been applied to the parts as the right cutoff valve 341 described above. Excessive pressure in left motor supply line 296 and branch 296' acting in port 347 acts on the unbalanced area on land $b$ to open the valve at port 348 to permit flow from branch 296' to the branch 304 of motor exhaust line 304. Similarly, on forward overrun, due to excessive pressure or normal pressure on engine overspeed, the high presure in exhaust line 304' is conducted via branch 304' to act at port 348 on the unbalanced area on land $c$ to open the valve to connect branch 304' via ports 348 and 347 to branch 296' of the supply line 296. The reverse operation is similar.

Cooling fluid supply valves

The right and left cooling supply valves 351 and 352, respectively, control the supply of fluid to and the exhaust of fluid from the right and left power transmitting circuits in order to provide a controlled predetermined volume of fluid continuously passing through the heat exchanged. These valves are constructed and function in the same manner and thus the following description and reference numerals apply to both valves. Cooling valves 351 and 352 have a valve element 353 having lands $a$, $b$ and $c$ of equal diameter located in a bore 354 having closed ends and ports as indicated below in the description of the connections.

The high pressure fluid, delivered by the right pump 257 during normal forward driving operation through supply line 277 to the right motor 278, is connected by branch 277' to port 356 at the left end of bore 354 to act on the unbalanced area of land $a$ of valve element 523 to move it to the normal forward drive position shown uncovering port 357 and connecting this pressure to the right pressure control line 359 to provide a control pressure which is the same as the pressure supplied to the right motor by the right pump. Supply branch 277' is blocked at port 358 by land $a$. The low pressure in motor exhaust line 286 is connected by branch 286' to port 360 at the other end of the bore to act on the unbalanced area of land $c$ but cannot move the valve 353 against the high supply pressure acting on the other end of the valve. The makeup or feed line 321 is connected to port 361, between lands $b$ and $c$ to port 362, branch 286' to feed cooled oil to the motor exhaust line 286 and pump inlet. Fluid is diverted from the motor exhaust line 286 at a point between motor 278 and branch 286' by diversion branch 286$d$ to port 363, between lands $a$ and $b$ of valve 353 to port 364 to the low pressure line, i.e., 150 p.s.i. and the excess returned via exhaust 378 to the sump by the low pressure relief valve 371.

In forward overrun, since the fluid pressure is higher in exhaust line 286 and the pressure is lower in supply line 277, the pressures on the ends of valve element 353 are reversed moving the valve element to the opposite end of bore 354. The high pressure in exhaust line 286 is connected by branch 286' and port 360 to act on land $c$ to move the valve and connected by port 365 to right pressure control line 359. The low pressure in branch 277' at port 356 does not move the valve element 353 and is not connected to the line 359. The feed line 321 is connected by port 361 between lands $b$ and $c$ and port 367 to branch 277$d$ to supply cool fluid to the power system as the fluid flows to motor 278 now acting as a pump. Branch 277' is connected by port 358, between lands $a$ and $b$ to port 364 and low pressure line 366 to exhaust hot fluid from the power system. In forward drive or overrun, the hot oil is diverted and further downstream cool oil is introduced.

During reverse drive, the cooling valve operates as in forward overrun and during reverse overrun the cooling valve operates as in forward. Though cool oil is introduced upstream from the diversion of hot oil the cooling requirements are less.

The left cooling valve 352 is constructed and operates in the same manner and has the same reference numerals. In forward drive the high pressure in left motor supply line 296 and branch 296' enters port 356 and moves the left valve 352 to the position shown connecting this pressure via port 357 to the left pressure control line 369. In this position the left valve element 353 connects feed line 321 to branch 304' connected to line 304 near left pump 262 to supply cool fluid to the power circuit. The hot fluid is exhausted or diverted by branch 304$d$ nearer the motor 297 and connected to low pressure line 366.

On overrun the high pressure in exhaust line 304 is connected by branch 304' to act on land $c$ to move the valve and connected to left pressure control line 369. Hot oil is diverted from motor supply line 296 through the low pressure line by branch 396' to low pressure line 366 and cool oil is fed from line 321 to line 296d to line 296 downstream and nearer the motor.

*Low pressure relief valve*

The relief valve 371 has a valve element 372 having lands a and b of equal diameter located in a bore 374. Low pressure line 366 is connected through the bore between lands a and b at all times and communicates via passage 376 to the closed end of bore 374 to act on land a to urge the valve against the biasing spring 377 to connect line 366 via exhaust 378 to sump to regulate the pressure in line 366 at a low pressure, i.e., 150 p.s.i. The spring chamber has an exhaust 379 for leakage fluid. Since all exhaust from the main line regulator valve 316 flows via line 321, the cooling valves and the power system to line 366 which is regulated by valve 371 at a low pressure, the minimum main line pressure is the same, i.e., 150 p.s.i.

*Governor valve*

The governor 12 includes the engine driven pump 308, venturi 313, associated lines and governor valve 328 which has a valve element 381 having lands a, b and c of equal diameter in a bore 382 having closed ends. High pressure governor line 315 is connected to the upper closed end to act on land a to urge the valve down from underspeed to normal and overspeed positions. The springs 383 and 383' and the low pressure from low governor pressure line 314 to the chamber at the lower closed end of the bore acting on land c act upwardly. The low governor pressure and the inner spring 383' act directly on the valve element 381 to bias the valve from overspeed through normal to underspeed position. The outer spring 383 acts through a washer 383" whose movement is limited by a stop shoulder in the valve bore so the outer spring only biases the valve from overspeed to normal position. Both springs seat on movable abutment 385. With the valve in the normal speed position shown at normal engine or pump input speeds, i.e., between 1700 and 2200 r.p.m. for an engine governed at 2100 r.p.m., low pressure line 366 is connected between lands b and c to overspeed signal line 337 while overload signal line 384–86 is connected to exhaust 386. When the governor pressures indicate engine overspeed, the valve moves down from normal to overspeed position against both springs blocking low pressure line 366 and connecting overspeed signal line 337 to exhaust 387 to bypass oil at overload valves as explained above to limit engine speed. When the engine speed is lugged down below normal operating speed, inner spring 383' moves the valve element up from normal to underspeed position and low pressure line 366 is connected to overload signal line 384 to move biasing piston 83. The abutment 385 is moved by the engine governor speed control linkage 10" to vary the speed response of governor 12 with the governed speed of governor 10'.

*Pump displacement controls*

The right and left pump displacement controls 391 and 392 are the same as described above. Each displacement control has a pump stroke or displacement control rod 91 which is manually actuated. The engine overload control 83 is actuated on underspeed by pressure supplied by the pump overload signal line 384 and branches 86 to reduce pump stroke. These controls through lever 93 jointly position the sleeve valve element 102 of the displacement control valve assembly while control piston 47 through cam 107 controls valve element 104 to control the displacement in accordance with the position of the center of lever 93. Stroke control rod 91 as moved from zero stroke position to full stroke position will demand a pump stroke in accordance with its position and will provide such stroke unless the overload piston reduces the stroke to prevent engine overload.

*Motor displacement control*

The right and left displacement control or constant pressure valves 396 and 397 control the displacement of the motor to prevent reduction of the pressure in the high pressure line in the power transmitting circuit below a minimum high pressure value varying with pump displacement. Since these valves are of identical construction, the following description and reference numerals apply to both valves. The displacement control valves have a valve element 398 having lands a, b, and c of equal diameter located in a bore 399. The main line 309 is connected to the center of the bore and blocked by the land b when the valve is in the central position. With the valve in this position, the more displacement port 401 is located between the lands a and b and blocked while the less displacement port 402 is located between the lands b and c and blocked. With the valve in the neutral position shown, exhaust 403 is blocked by the land a while exhaust 404 is blocked by the land c. The exhaust 406 leakage fluid from the space between the valve element 398 and the plug or piston 407. The pressure control line, right 359 or left 369, is connected to the pressure control port 408 to act on the plug 407 to bias the valve in a more displacement direction. A spring 409, seated on a movable abutment 411 biases the valve in the opposite or less displacement direction. Exhaust 410 vents the spring chamber. The movable abutment 411 is connected to the displacement control rod 91 by a suitable linkage which may include a rod 412 suitably attached to the displacement rod 91 and extending from the displacement control rod 91 at the left of the drawing to the motor displacement control valve 396. The rod 412 is pivotally connected at one end to a direction reversing lever 414 which is pivoted to the housing at its center and at the other end to a rod 416 fixed to or abutting the abutment 411. The linkage 412–414 and 416 thus positions the abutment between zero and full pump displacement positions in accordance with the position of the displacement control rod 91.

The more and less displacement ports 401 and 402 of the right displacement valve 396 are connected by the right more and less displacement lines 417 and 418 to the more and less displacement chambers respectively of the control cylinder of right motor 278 which is the same as the control cylinder 46 of FIGURE 4 to control the displacement of the pump.

The left displacement control valve 397 has its more and less displacement ports 401 and 402 connected respectively by the left more and less displacement lines 419 and 421 to the cylinder of the similar left motor 297 to control the motor displacement.

The displacement control valves 396 and 397 control the displacement of each motor in order to maintain a minimum pressure of fluid being supplied to the motor at a value varying with pump displacement demand or the position of the control rod 91 for the pump supplying that motor. The high pressures from the power circuits connected by the right and left pressure control lines 359 and 369 act on plugs 407 to move the pump displacement valves to the more displacement position to hold the motors at full displacement whenever the system pressure curve, FIG. 2, is above the minimum pressure curve 336, FIG. 2, varying from low to high, i.e., zero to 1000 p.s.i., with pump displacement demand. The minimum pressure curve 336 is obtained when pump displacement demand is gradually raised with displacement. If the pump displacement control is set at full displacement relying on the overload control to provide a gradual displacement increase, the minimum pressure is always the high value, i.e., 1000 p.s.i., curve 336a. When the system pressure drops to the minimum pressure indicated by the curves, the motor displacement is reduced to maintain a constant minimum system pressure. The spring 409 at zero pump displacement demand has zero biasing force so curve 336 starts at zero pressure and increases to a maximum, i.e., 1000 p.s.i. at full stroke demand or 1000 r.p.m. This arrangement has the advantage of holding full motor displacement during a larger portion of the operation. The springs 409 may be set to provide a minimum pressure, i.e., 500 p.s.i., varying with pump displacement demand as indicated by curve 336b to maintain the minimum pressure at a higher value. A partial power operation, one-half power is illustrated in FIG. 3. Since only one-half power, curve 335', is provided, the torque curve 333' and pressure curve 331' drop faster. The pressure drop will be limited at the point that curve 331' crosses curve 336' and at this speed pump displacement, curve 332', will reach a maximum at about three-fourths the displacement, and motor displacement will be reduced from full displacement gradually to one-half displacement where the control piston hits a stop at top speed, curve 334'.

*Operation*

The power flow circuits each consisting of a delivery, return, supply and exhaust lines controlled by a reversing valve provide fluid transmission of power between the pumps and motors.

When the right reversing valve 267 is in the neutral position N, the right pump delivery 203 and return 201 lines and the motor supply 277 and exhaust lines 286 are all interconnected at the reversing valve so that the transmission is in positive neutral with the pumps unloaded and the motors freewheeling. The left reversing valve 293 similarly interconnects the left delivery 203' and return 201' lines and supply 296 and exhaust 304 lines for positive neutral. When both the reversing valves 267 and 293 are moved to the forward position F, both motors are driven in a forward direction. The right pump delivery line 203 is connected to deliver pump pressure to the right motor supply line 277 to drive the right motor forwardly and the right motor exhaust 286 is connected to the right pump return line 201. Similarly, the left delivery line 203' is connected to the left motor supply line 296 and the motor exhaust 304 is connected to the pump return 201'.

The transmission having positive displacement pump and motors and a displacement control is preferably employed with an engine operating at a governed speed. The transmission will automatically select the proper torque multiplication ratio from a large range of torque multiplication ratios available to provide an infinitely variable drive for starting and driving a load or vehicle with maximum performance obtained by maintaining the engine operating at its governed speed for full power. As indicated by the pump displacement curve 332 and the motor displacement curve 334 of FIG. 2, which illustrates the full power operating curves for the transmission, the pump displacement is zero at zero speed and the motor displacement is full, so no power is transmitted. The first increment of pump displacement theoretically provides infinite torque multiplication but about 10:1 in most practical applications is obtained. At the mean output speed, i.e., 1000 r.p.m., both the pump displacement and the motor displacement are full and a 1:1 drive is provided. In the higher speed range, the displacement of the motor is reduced, as indicated by the curve 334, while the pump continues to operate at full displacement to provide decreasing torque multiplication through increasing overdrive ratios.

The transmission is in neutral when the displacement control rods 91 for pumps 257 and 262 are in the zero displacement position locating the eccentric crank control 36 and the swash plate arm on the axis of rotation so that the pump pistons are not moved and no fluid is pumped to the power circuits connected to the motors 278 and 297. Whenever the engine is running, the engine driven pump 308 supplies fluid to the line 309, which is regulated at a low control pressure value, i.e., 150 p.s.i., by the regulator valve 316 to supply control fluid to the control system and overage fluid to makeup line 321 and the cooling valves 351–352 to the power circuits of the transmission to condition the transmission for operation.

The operating characteristics of the transmission transmitting full engine power to drive a full load are shown in FIG. 2. The right and left displacement control rods 91 may be manually moved gradually from the zero displacement position to the full displacement position so the valve members 104 in both the right and the left control units act without the overcontrol of the engine overload control pistons 83 to provide the gradually increased pump displacement of curve 332 for both the right and left pumps. When the pump displacement controls 91 are moved more quickly or instantaneously to the full displacement position, the overload control pistons 83 only permit pump displacement to increase gradually, i.e., curve 332 showing the maximum rate of increased displacement permitted. On moving pump displacement control rods to full displacement, the valve members 101 will control the pumps 257 and 262 to supply fluid under pressure to the power circuit. With the reversing valves 252 and 293 in the forward position, this fluid is connected by lines 277 and 296 respectively to the motors 278 and 297. Since the motors are not rotating, flow is blocked, and the power circuit pressure quickly rises, as indicated by curve 331 in FIGURE 2, and is limited by the above explained operation of the cutoff valve 341 and 342 at a maximum power circuit pressure, i.e., 5000 p.s.i. The motors are in the full displacement position, and this maximum pressure provides maximum torque to drive the load and a maximum load on the engine which will reduce the engine speed slightly below the governed speed causing the overload and overspeed governing valve 328 to supply fluid to the overload signal line 384 which actuates the overload pistons 83 to move them in a direction opposite to the movement of rod 91 to position the displacement control valve 104–105 and pumps 257–262 at substantially zero or a very low displacement position, less than the initial displacement. This permits the engine to return to governed speed and the overload control pressure line 86 is momentarily cut off by the governor valve 328 to permit the spring 87 to return piston 83 to provide a small increment of increased displacement until the speed is again reduced. This operation continues providing a gradual increase in the pump displacement as shown by the pump displacement curve 332, FIG. 2. For this type of operation piston 83 must move enough to reduce the displacement to zero on full movement of rod 91. Reduced movement of piston 83 will permit a proportional degree of overloading.

Maximum power during full power operation is obtained at a very low output speed, as indicated by the power curve 335. As soon as maximum power is obtained, the power circuit pressure drops as indicated by curve 331. It will be noted that the power circuit pressure curve 331 and the torque curve 333 are the same in the first half of the speed range at full power where the motor is at full displacement, curve 334. The pump displacement, as indicated by curve 332, gradually increases to a maximum at a mean output speed, i.e., one-half speed, 1000 r.p.m. The overload control pistons 83 will properly position the pump displacement control valves to provide the proper torque multiplication to maintain the engine at the governed speed. The pump stroke reaches a maximum at 1000 r.p.m. because the governor valve does not provide an overload pressure above this speed. The motor displacement valves 396 and 397 maintain full motor displacement as long as the power circuit pressure is above the minimum pressure at full pump displacement, curve 336, i.e., 1000 p.s.i., which is maintained to half speed at full power.

From half speed to full speed the pump displacement remains at a maximum as indicated by the pump displacement curve 332. The system pressure, during this range from half speed to full speed, would, if uncontrolled, further reduce along the same general curve, similar to the torque curve 333, FIGURE 11. However, in order to maintain high efficiency, the displacement control valves 396 and 397, as explained above, reduce the motor displacement, as shown by the motor displacement curve 334 to maintain a minmum system pressure of 1000 p.s.i. in the fluid power circuit, as shown by system pressure curve 331. The torque curve 333, FIGURE 2, shows that the hydrodynamic drive system provided by the pumps and motors provides an overdrive when the motor displacement is reduced. It is preferred that the input gearing between the engine and pumps provide a greater speed multiplication than the speed multiplication between the output and motor so 1:1 overall drive is at a high speed, i.e., 1500 r.p.m. or full speed, i.e., 2000 r.p.m. The power output curve 335 indicates that full power is available throughout the major portion of the operating range.

When the engine with a speed limiting governor is operating at any partial power output, i.e., half engine power with the throttle at about half throttle position, the transmission will operate in a similar manner to provide the operating characteristics illustrated by the curves in FIGURE 3. The power as indicated by the power curve 335' will quickly rise to half power and thereafter remain constant. The pump displacement as indicated by curve 332' will rise in the same manner as curve 332 to about three-fourths displacement, but will not rise any higher because the engine overload control piston 83 limits the increase in displacement. At this same speed, i.e., 750 r.p.m., the power circuit pressure 331' will tend to fall below the curve 336' indicating the minimum power circuit pressure and thus reduce the motor stroke as indicated by curve 334' to regulate the power circuit pressure at a constant value, i.e., 750 p.s.i., as indicated by curve 331'.

If the pump displacement controls are in the full displacement position, the minimum pressure curve 336'a will be in effect, providing a higher minimum pressure from the point where curve 331' crosses curve 336'a, i.e, 1000 p.s.i., and an earlier reduction in motor displacement at this point. If a higher pressure spring, i.e., 409, is employed in the motor displacement valve, i.e., 396, the pressure is limited at the point where curve 331' crosses curve 336'b and motor displacement is reduced at this point.

The reduction of motor displacement is limited by a stop at a mean value, i.e., one-half stroke as indicated by the curve at the top driving speed at one-half power.

Thus this control system provides in the first range of operation, i.e., zero to 1000 r.p.m. manual control of the load or ground speed by means of the pump displacement control. The speed, as indicated, increases with increasing pump displacement within the limits of the overload control. Thereafter the transmission operates much like a ratio transmission in high ratio and will accelerate the load or vehicle to higher speeds between 1000 and 2000 r.p.m. if the power is available to provide this acceleration.

For reverse drive both of the reversing valves 267 and 293 are placed in the reverse position to reverse the connections to the motors. As explained in detail above, the high pressure outlet from the pump 257 is then connected to the motor exhaust line 286 and the motor supply line 277 is connected to the pump intake line 201. A similar reversal of the connection between the left pump 262 and the left motor 297 is provided by a left reversing valve 293. With these connections the pump, driven in the same manner as in forward drive, drives the motors in the reverse direction to provide reverse drive. The control system otherwise functions in the same general manner as in forward drive. The input drive for the pump rotates in the same direction and the pump displacement controlled by the displacement control rods 91 and the engine overload control pistons 83 and valves 105 function as in forward drive to control pump displacement. The cutoff valves 341 and 342 function in the same manner as explained above for forward drive and forward overrun, except that with reference to the right motor the motor exhaust line 286 is the high pressure line in reverse drive and the motor supply line 277 is the high pressure line in reverse overrun. As explained above, the cutoff valves 341 and 342 function the same way regardless of which of these lines has the higher pressure. Thus in reverse they function as in forward to limit the power circuit pressure to a safe maximum value, i.e., 5000 p.s.i. both in reverse drive and reverse overrun. The engine overspeed control would function in the same manner to open the cutoff valves at a lower pressure to prevent engine overspeed and provide hydraulic braking. The cooling valves 351 and 352 function in substantially the same manner. However, the relative position of the supply and the exhaust from the supply line 277 operating as a return line from the motor to the pump would be reversed and provide less effective cooling. Since the duration of reverse operation is less than forward operation, this arrangement will provide sufficient cooling. The motor displacement control valves 396 and 397 will function in the same way as in forward drive to reduce the motor displacement to prevent reduction of the power circuit pressure below curve 336' which varies with pump displacement demand.

Steering is provided by actuating pump displacement control rods 91 individually to increase the displacement of one pump while decreasing displacement of the other pump. Thus if the displacement of the right pump is increased and the displacement of the left pump is decreased, left steer will be obtained. This is done by a suitable whiffle tree linkage. Pivot steer may also be obtained by placing one of the reversing valves in the forward drive position and the other reversing valve in the reverse drive position. During steering operation the controls function in the same manner as explained above for either the forward or reverse drive as provided by the steering controls.

When the vehicle or other load overruns the engine in forward drive, the motors 278 and 297 will supply high pressure fluid via exhaust line 286 and 304, respectively, to return lines 201 and 201' to drive the pumps as motors so that the vehicle is retarded by engine braking. When the pressure in the exhaust and return lines increases above the high pressure value, i.e., 5000 p.s.i., it is relieved by the cutoff valves 341 and 342. The right return line 286 is connected by branch 286' to port 348 of the right cutoff valve 341. The pressure in port 348 acts on the land c of valve element 343 and opens the valve to connect the pressure via branch 277' to the exhaust line 277 to prevent increase of pressure above this high value. The throttling effect at port 348 effected by land c absorbs energy from the system and converts it into heat, heating the fluid and thus adds to the braking effort of the engine by providing an independent braking effort due to the hydraulic system. Some of this heated fluid is permitted to bypass from the port 347 through bypass 349 to exhaust so that a larger volume of fluid passes through the heat exchanger 312 when the cutoff valve 341 functions to bypass fluid. The left cutoff valve 341 will similarly function to limit the pressure in the exhaust line 304 to a high value, i.e., 5000 p.s.i. If the vehicle or load overruns the engine to a degree causing dangerous overspeed engine operation, the governor valve 328 cuts off the supply of control pressure from line 366 to overspeed signal line 337 to permit the cutoff valves 341 and 342 to dump the fluid in exhaust lines 286 and 304 regardless of pressure. This reduces the drive to the engine and reduces engine speed to a safe value. The high engine braking and high hydraulic braking due to the throttle effect on the fluid passing through the cutoff valves continues.

The above preferred embodiments are illustrative of the invention and it will be appreciated that they may be modified within the scope of the appended claims.

We claim:

1. In a transmission driven by an engine having a constant speed governor having a speed selecting device to control the fuel supplied to the engine to maintain a selected constant engine speed, the combination of a fluid pump and motor unit having drive means adapted to be driven by an engine, driven means adapted to drive a load, pump menas driven by said drive means, motor means driving said driven means, power circuit means connecting said pump and motor means to supply fluid from said pump means to said motor means and return fluid from said motor means to said pump means, and pump displacement varying means to vary the displacement of said pump means; governor means operatively connected to said drive means providing a governor signal in response to pump speed; speed control means for adjustably controlling the predetermined speed setting of an engine speed control governor connected to said governor means to vary said governor means in accordance with variations in the engine speed setting of the engine governor; and displacement control means having a controlling means and operatively connected to said pump displacement varying means and said governor means and operative to control the displacement of said pump means in response to said controlling means and said governor signal.

2. The invention defined in claim 1 and said governor means providing a governor signal in response to engine underspeed; said displacement control means being operative in response to said underspeed signal from said governor means to actuate said pump displacement varying means to reduce pump displacement.

3. The invention defined in claim 1 and said governor means providing an engine overspeed signal, and said displacement control means being operative in response to said engine overspeed signal to increase pump displacement.

4. The invention defined in claim 1 and said governor means providing an engine overspeed signal, means to bypass fluid from the higher pressure line to the lower pressure line of said power circuit operatively connected to said governor means and operative in response to said engine overspeed signal to bypass fluid from the higher to the lower pressure line of said power circuit.

5. The invention defined in claim 1 and said motor displacement varying means to vary the displacement of said motor means; and said displacement control means operatively connected to said motor displacement varying means to vary the displacement of said motor means in response to said controlling means.

6. The invention defined in claim 1 and said motor displacement varying means to vary the displacement of said motor means; and the higher pressure in said power circuit.

7. In a transmission, a constant speed engine governor having a speed selecting device for controlling the fuel supplied to an engine to maintain a selected constant engine speed, the combination of a fluid pump and motor unit having drive means adapted to be driven by an engine, driven means adapted to drive a load, pump means driven by said drive means, motor means driving said driven means, power circuit means connecting said pump and motor means to supply fluid from said pump means to said motor means and return fluid from said motor means to said pump means, and pump displacement varying means to vary the displacement of said pump means; governor means operatively connected to said drive means providing a governor signal in response to pump speed; speed control means for adjustably controlling the predetermined speed selection of the selecting device of said constant speed governor connected to said governor means to vary said governor means in accordance with variations in the selected speed set by said selecting device; and displacement control means having a controlling means and operatively connected to said pump displacement varying means and said governor means and operative to control the displacement of said pump means in response to said controlling means and said governor signal.

8. The invention defined in claim 7 and said governor means providing a governor signal in response to drive means underspeed; said displacement control means being operative in response to said underspeed signal from said governor means to actuate said pump displacement varying means to reduce pump displacement.

9. The invention defined in claim 7 and said governor means providing a drive means overspeed signal, and said displacement control means being operative in response to said engine overspeed signal to increase pump displacement.

10. The invention defined in claim 7 and said governor means providing a drive means overspeed signal, means to bypass fluid from the higher pressure line to the lower pressure line of said power circuit operatively connected to said governor means and operative in response to said drive means overspeed signal to bypass fluid from the higher to the lower pressure line of said power circuit.

11. The invention defined in claim 7 and said motor displacement varying means to vary the displacement of said motor means; and said displacement control means operatively connected to said motor displacement varying means to vary the displacement of said motor means in response to said controlling means.

12. The invention defined in claim 7 and said motor displacement varying means to vary the displacement of said motor means; and the higher pressure in said power circuit.

No references cited.

EDGAR W. GEOGHEGAN, *Primary Examiner.*